July 12, 1932.  F. E. WILLIS  1,867,392
BRAKE
Filed Sept. 9, 1929  2 Sheets-Sheet 1
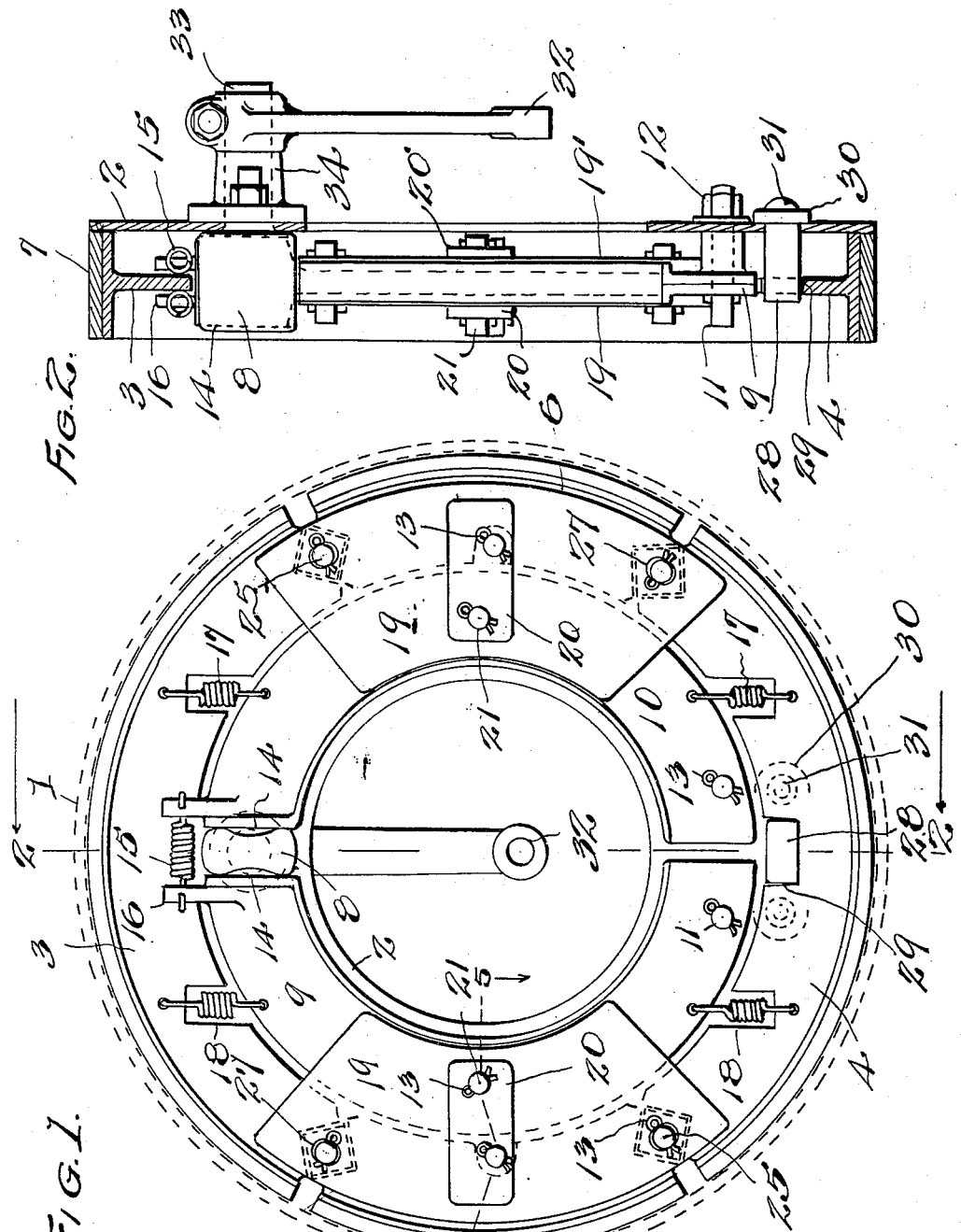
Inventor
FERGUSON E. WILLIS
Attorney July 12, 1932. F. E. WILLIS 1,867,392
BRAKE
Filed Sept. 9, 1929 2 Sheets-Sheet 2
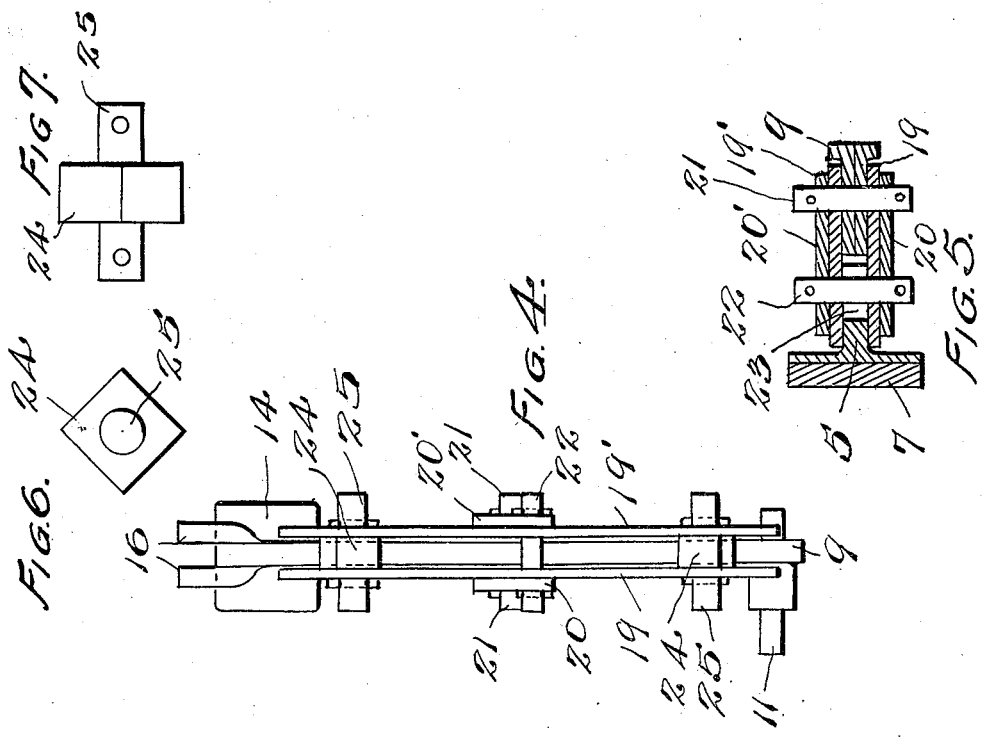
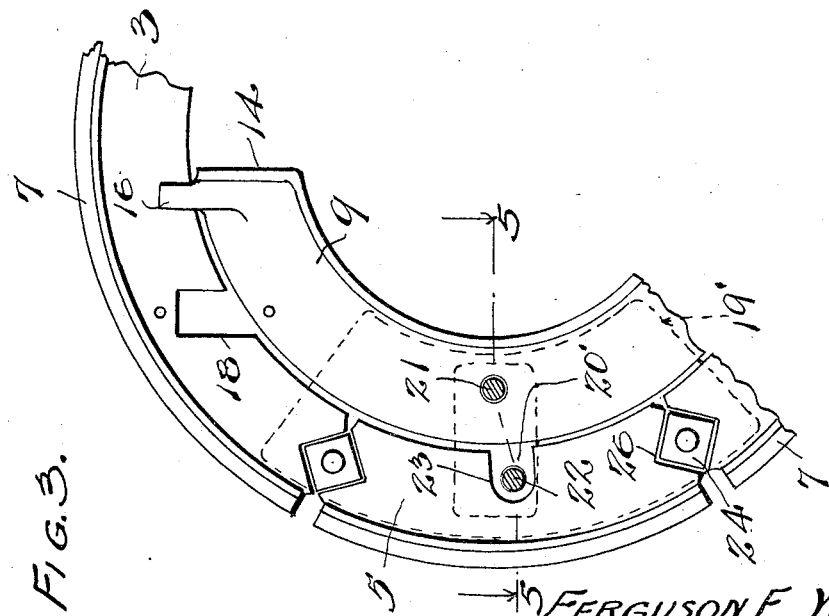
Inventor
FERGUSON E. WILLIS
By
Attorney Patented July 12, 1932

1,867,392

UNITED STATES PATENT OFFICE

FERGUSON E. WILLIS, OF DETROIT, MICHIGAN

BRAKE

Application filed September 9, 1929. Serial No. 391,347.

My present invention relates to improvements in brakes for automotive vehicles, and of the cam actuated, internally expanding type employing a plurality of segmental brake shoes for frictional contact with a brake drum.

The primary object of my invention is the provision of a brake of this type which is simple in construction and operation; of which the parts may with facility and convenience be assembled, and with equal facility may be removed for repairs or replacement of parts, as well as for adjustment; and which may be manufactured at a comparatively low cost of production.

In carrying out my invention means are provided for a maximum of frictional contact between the brake shoes and drum, and a uniform distribution of pressure of the shoes against the drum is assured to attain the highest efficiency in the application of the brakes to a wheel.

The invention consists in certain novel combinations and arrangements of parts as will hereinafter be more fully set forth and claimed. In the accompanying drawings I have illustrated one complete example of the physical embodiment of my invention wherein the parts are combined and arranged according to the best mode I have thus far devised for the practical application of the principles of my invention. Changes and alterations in the exemplified structure are contemplated and may be made, within the scope of my claims without departing from the principles of my invention.

In the accompanying drawings, Figure 1 is a face view of the device embodying my invention, showing a brake drum in dotted lines. Figure 2 is a transverse vertical sectional view at line 2—2 of Figure 1. Figure 3 is a face view of a portion of the device with parts in section, showing part of a section of the split expanding ring, together with some of the brake shoes and connecting members. Figure 4 is an edge view as seen from the right in Figure 1, with the shoes removed, and showing a section of the split ring, side plates, links, and some of the expanding lugs or wedges. Figure 5 is a detail sectional view at line 5—5 of Figures 1 and 3. Figures 6 and 7 are detail views of one of the wedge lugs or expanding lugs that couple the brake shoes.

The drum, indicated by dotted lines 1 and back plate 2 may be of suitable type for coaction with the parts of my invention, and in combination with the drum I utilize a plurality of brake shoes 3, 4, and 5, 6 for frictional contact with the inner face of the drum. The brake shoes as shown are used in pairs, i. e. one pair of short segmental flanged members 5 and 6 is diametrically arranged with relation to the two long segmental shoes 3 and 4, and all of the shoes are provided with a lining as 7, the latter being secured to the shoes in usual manner.

The shoes are caused to operate and expand into frictional contact with the drum through the rocking movement or actuation of a cam 8, and the rocking movement of the cam is transmitted through the sections 9 and 10 of a split ring located within the inner periphery of the ring formed by the segmental brake shoes. Each section of the split ring is pivoted on a pin or stud 11 which projects through a boss on the section and also through a hole in the back plate or stationary support 2, and a nut 12 is threaded on the threaded end of the stud as best seen in Figure 2. A cotter pin 13 is passed through a hole in one end of the stud to hold the latter and the ring section in proper position so that the section may swing on its pivot when the cam is turned.

Two of the adjoining ends of the ring sections are fashioned with complementary friction faces 14 against which the cam engages, and a pair of springs 15 stretched across the cam and coupled at their ends to pairs of posts 16 on the sections 9 and 10 hold the friction faces in contact with the cam.

By means of two pairs of springs 17 located in notches 18 of the shoes 3 and 4 these shoes are resiliently joined to the two ring sections 9 and 10 to retain the parts in their relative positions.

At diametrically opposite points in the brake device are arranged pairs of side plates 19, 19 and 19', 19', and pairs of links 20, 20 and 20', 20', the former lying flat against the sides of the ring sections and shoes, and the latter lying against the side plates. At diametrically opposite sides of the center of the brake and of the line of division between the sections of the split ring are located push pins 21 that pass transversely through the ring sections and the side plates and links, and cotter pins 13 are used at the ends of the push pins for retaining the parts in proper position. A pair of retaining pins 22 also pass through holes in the links, and through a notch 23 in the inner edge of each of the short shoes 5 and 6, and from this construction it will be apparent that as the split ring is expanded the push pins 21 will push outwardly the side plates 19 and 19', the pins 22 having no contact with the shoes of the brake.

The movement of the side plates is transmitted to the shoes through the instrumentality of a number of squared, wedge blocks 24 having trunnions 25 and located in angular notches 26 of the adjoining ends of the plurality of shoes. The side plates are provided with slots or elongated holes 27 that slip over the ends of the trunnions and the cotter pins 13 are used to retain the plates on the trunnions. As best seen in Figure 3 the squared wedge blocks are arranged diagonally on radial lines from the center of the brake and the outer pair of angular faces of the blocks frictionally engage against complementary angular disposed faces of adjoining shoes. Thus, when the pins 21 push outwardly on the side plates, the plates, through the trunnions push outwardly on the wedge blocks, and the latter are sufficiently moved outwardly in a radial direction to spread the shoes and force them outwardly into contact with the drum. The split ring of course expands against the tension of the springs 15, and consequently when the brakes are released the retraction of the springs causes the inner wedge or angular faces of the blocks to engage the complementary edges of adjoining shoes and the shoes are thus retracted. Because of this arrangement of parts the shoes may be retracted a sufficient distance from the drum to insure the necessary clearance between the drum and the lining to eliminate possibility of dragging the brakes, and to provide a space for the circulation of air and consequent rapid cooling if the brakes are overheated.

By means of the wedge blocks the shoes are flexibly coupled together, and they are anchored through the medium of one shoe, as 4, to the back plate 2.

For this purpose I utilize an anchoring lug 28 that fits into a notch 29 in the inner edge of the shoe 4, and this lug is rigid with an outer, attaching plate 30 that is riveted at 31 against the side of the back plate.

A well known type of brake lever 32 is illustrated (but not necessarily in its customary position) as clamped on the cam shaft 33 of the cam 8, and the shaft is journaled in a bearing 34 bolted or riveted on the exterior face of the back plate.

The parts of the device may be fashioned in suitable manner, as by stamping, pressing, or rolling from steel blanks, and of course their shapes and dimensions may be varied if desired within practical limits of construction and operation of the device.

The pressure in the application of the shoes to the drum is distributed over four separated points about the inner periphery of the drum in order that the plurality of shoes may uniformly and equally distribute the frictional contact for the braking action. The flexible connections, or wedge blocks, between the segmental shoes permits the shoes to be adapted to any irregularity or distortion of the brake drum, and the maximum friction is thus automatically maintained under all conditions.

Due to the simplicity in construction and arrangement of the parts, the process of relining the brakes may be accomplished with a minimum amount of time and minimum expenditure of labor. By detaching the four springs 17 to free the shoes from the split ring, the shoes may successively be slipped outwardly from the wedge blocks, which it will be remembered are loose and may rock or turn on their trunnions, and after the shoes are relined, they may readily be replaced and the springs again suspended in their proper positions.

Having thus fully described my invention, what I claim as new and desire to secure by Letters Patent is:—

1. In a brake device the combination with an expanding ring and means for expanding the ring, of a plurality of shoes surrounding the ring, means intermediate its ends for anchoring one only of the shoes against circumferential movement, resilient means connecting the shoes and ring, expanding members coupling the adjoining ends of the shoes, and means for transmitting motion of the expanding ring to said members.

2. In a brake device of the type described, the combination with a plurality of brake shoes, means intermediate its ends for anchoring one only of the shoes against circumferential movement, of wedge blocks interposed between complementary adjoining ends of the shoes and coupling said shoes as a flexible ring.

3. The combination with an expanding ring, a plurality of segmental brake shoes, means intermediate its ends for anchoring one only of the shoes against circumferential movement, means for expanding the ring, of a series of wedges forming flexible couplings between ends of adjoining shoes, and means for transmitting pressure from the expanding ring to said wedges.

4. The combination with an expanding ring, a plurality of segmental brake shoes having angular notched ends, and means intermediate its ends for anchoring one only of the shoes against circumferential movement, of a series of wedge blocks interposed between ends of adjoining shoes, and means for transmitting pressure from the expanding ring to said blocks.

5. The combination with an expanding ring, a plurality of segmental brake shoes having angular notched ends, an anchor for one of said shoes, and springs connecting said ring and some of the shoes, of wedge blocks interposed between ends of adjoining shoes, trunnions on said blocks, side plates supported on the trunnions, and push pins pivotally connecting said ring and side plates.

6. The combination with an expanding ring, a plurality of segmental brake shoes having angular notched ends, an anchoring lug engaging a notch in one of said shoes, and springs connecting said ring and shoes, of wedge blocks interposed between ends of adjoining shoes, trunnions on said blocks, side plates each supported in pairs on pairs of trunnions, and push pins pivotally connecting said ring and plates in pairs.

In testimony whereof I have affixed my signature.

FERGUSON E. WILLIS.